United States Patent [19]
Hampel et al.

[11] 3,936,026
[45] Feb. 3, 1976

[54] SWIVEL BASE ASSEMBLY

[75] Inventors: Herbert J. Hampel, Philadelphia, Pa.; William A. Hoffman, Collingswood, N.J.

[73] Assignee: Ultronic Systems Corporation, Moorestown, N.J.

[22] Filed: Mar. 24, 1975

[21] Appl. No.: 561,639

[52] U.S. Cl. ............... 248/349; 174/70; 248/425; 339/8 R; 174/86
[51] Int. Cl.² ......................................... H02G 11/00
[58] Field of Search ............. 174/86, 58, 70, 21 JR, 174/21 JC, 135; 248/349, 131, 425; 339/2 R, 2 L, 2 RL, 5 R, 5 RL, 6 RL, 8 R, 8 RL, 9 RY, 1 R

[56] References Cited
UNITED STATES PATENTS

| | | | |
|---|---|---|---|
| 2,687,267 | 8/1954 | Copenhaver | 248/131 X |
| 3,152,218 | 10/1964 | Blanco | 174/70 |
| 3,409,265 | 11/1968 | Wichers et al. | 248/349 X |
| 3,462,112 | 8/1969 | Vom Brack et al. | 248/349 |

*Primary Examiner*—Darrell L. Clay
*Attorney, Agent, or Firm*—Peter Xiarhos; Elmer J. Nealon; Norman J. O'Malley

[57] ABSTRACT

A swivel base assembly for supporting a device such as a video display terminal (including a video monitor and a keyboard) and including means for rotating the device through a large angle, for example, 270°. The swivel base assembly includes a tray on which the device is positioned and a circular base member having a space for containing a circularly-wound data-carrying cable, such as a coaxial cable, for use by the device on the tray. The base member also includes a pair of upstanding spaced stop members formed therein and arranged to cooperate with a depressed stop member formed in the tray to establish the aforementioned 270° range of angular rotation. The base member further includes a plurality of glide members inserted within vertical support columns therein for evenly distributing the weight of the tray and the device on the tray and also includes a depressed cable guide and strain relief member for use in arranging the data-carrying cable within the base member and also for providing strain relief for the data-carrying cable. Provision is also made in the various members of the swivel base assembly for the passage of an ac power cable to the device on the tray.

6 Claims, 7 Drawing Figures

SWIVEL BASE ASSEMBLY

BACKGROUND OF THE INVENTION

The present invention related to a swivel base assembly and, more particularly, to a swivel base assembly for supporting a device thereon and including means for receiving and containing therein a circularly-wound electrical cable for use by the device. The device supported by the swivel base assembly is capable of being rotated through a large angle, for example, 270°.

Various swivel base assemblies for supporting and rotating devices are generally well known to those skilled in the art. By way of example, television receivers as commonly used in the travel and lodging industry are generally supported on swivel base assemblies and permitted to rotate through large angles to establish wide ranges of viewing for users of the receivers. Generally, the angles of rotation of television receivers supported on swivel base assemblies as mentioned above are limited by stop arrangements included in the swivel base assemblies, these stop arrangements generally limiting the angles of rotation to better than 200° but less than 360°. Electrical operating power for the receivers is generally supplied by ac power cables which are normally connected directly from rear portions of the receivers to suitable sources of ac line voltage. While the swivel base assemblies as employed with television receivers as mentioned above operate in a generally satisfactory manner, they cannot be used satisfactorily with other kinds of devices, such as video display terminals, which require data carrying cables (e.g., coaxial cables) in addition to ac power cables.

Other well-known forms of rotatable swivel base assemblies, such as "lazy Susans," generally do not include stop arrangements and, insofar as is known, are not used with electrical devices (such as video display terminals) and cables associated with these electrical devices.

BRIEF SUMMARY OF THE INVENTION

In accordance with the present invention, a swivel base assembly is provided which is particularly useful with a device such as a video display terminal.

The swivel base assembly of the invention generally includes a tray means having a top surface on which a device is adapted to be positioned, a base arrangement, and a swivel means interposed between the tray means and the base arrangement. The tray means further has a bottom surface and includes a stop means. The swivel means has a first section attached to the tray means and a second section attached to the base arrangement. The first section of the swivel means and the tray means attached thereto are capable of rotational movement with respect to the second section of the swivel means and the base arrangement to which the second section is attached.

The base arrangement generally includes a stop means, glide means and a cable-receiving portion. The stop means of the base arrangement cooperates with the stop means of the tray means to establish a predetermined angular range through which the tray means, a device on the tray means, and the first section of the swivel means to which the tray means is attached may rotate. The glide means of the base arrangement is adjacent to the periphery of the swivel means and bears against the bottom surface of the tray means to provide a bearing surface along which the tray means may glide when a rotational motion is imparted to the tray means with respect to the second section of the swivel means. The cable-receiving portion of the base arrangement defines a chamber and has a cable opening into the chamber. The chamber is arranged to receive a cable means via the cable opening to be used by a device on the tray means and has a capacity to permit the cable means to be wound therein in a generally circular pattern.

The aforedescribed tray means, swivel means and base arrangement each further have an opening therein by which one end of a cable means wound within the chamber of the base arrangement may be fed through the opening in the base arrangement, the opening in the swivel means, and the opening in the tray means to a device on the tray means.

BRIEF DESCRIPTION OF THE DRAWING

Various objects, features and advantages of a swivel base assembly in accordance with the present invention will be apparent from the following detailed discussion taken in conjunction with the accompanying drawing in which:

Referring now to FIGS. 1–4 there is shown a swivel base assembly 1 in accordance with the present invention. The swivel base assembly 1, an exploded view of which is shown in FIG. 1, generally includes a tray 3, a flat tray support plate 5, a swivel mechanism 7, a base member 9, and a flat bottom cover plate 11. The tray 3, as employed in accordance with the invention, is arranged to receive and support a device, such as a video display terminal (shown in FIG. 2), as desired to be employed by a user. The video display terminal shown in FIG. 2 includes a video monitor and an associated keyboard. As will be described hereinafter, the tray 3 is secured, via the tray support plate 5, to a flat rectangular top plate 7a of the swivel mechanism 7 and is rotatable with respect to a flat rectangular bottom plate 7b of the swivel mechanism 7 through a large angle, for example, 270°, to provide a large range through which the device (e.g., video display terminal) positioned on the tray 3 may be made accessible to the user. In the case where the device on the tray 3 is to be a video display terminal, as suggested above, the tray 3 is provided with a rear and side railing portion 3a around approximately half the periphery of the tray 3, as shown in FIG. 1, for containing the video monitor on the tray 3. The remaining portions of the sides of the tray 3 are left open, as shown at 3b in FIG. 1, to accommodate the use of a keyboard (shown in FIG. 2) of any one of several possible widths, from narrow to wide, as required to be used with the video monitor. The keyboard itself is prevented from sliding off of the front side of the tray 3 by means of a front railing portion 3c.

Figure 1:
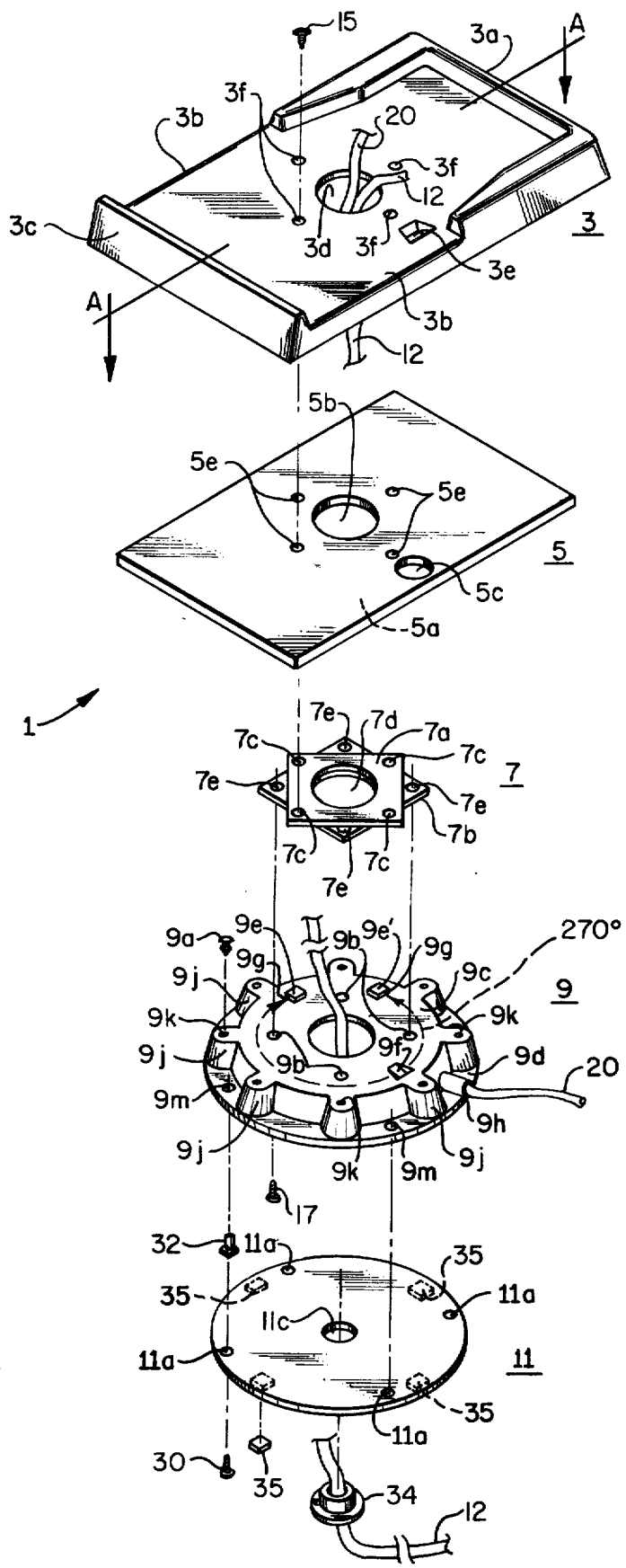
FIG. 1 is an exploded view of a swivel base assembly in accordance with the present invention.
Figure 2:
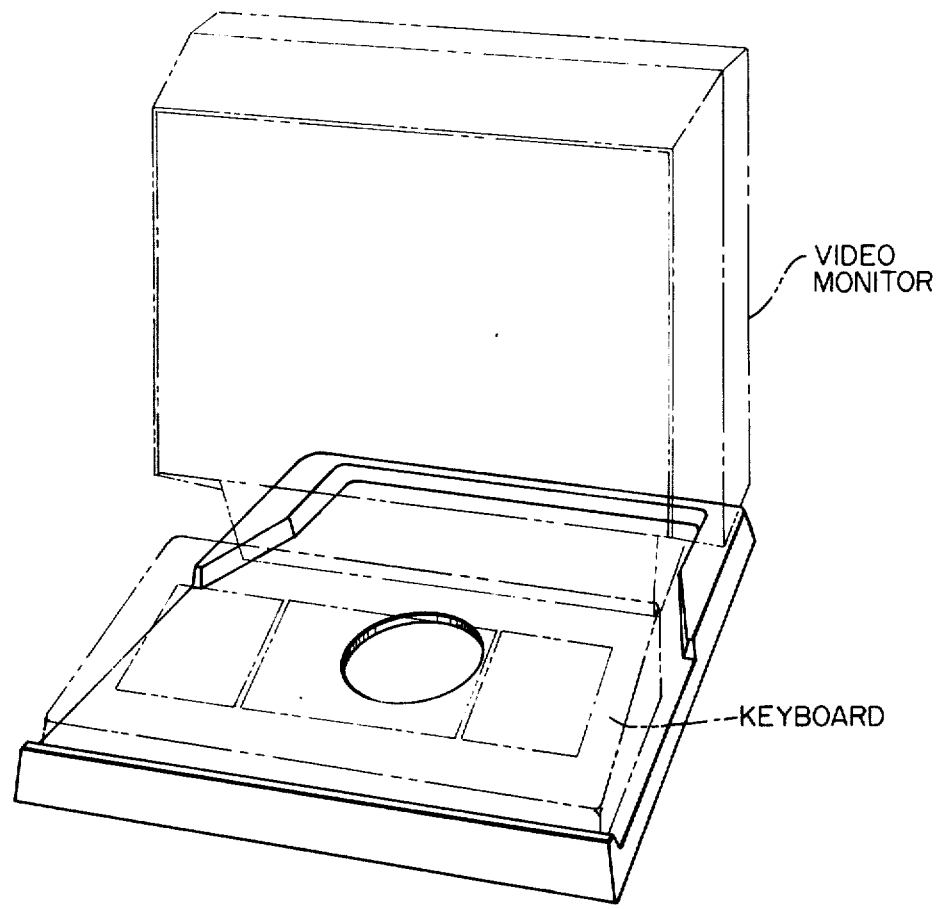
FIG. 2 is a perspective view of the swivel base assembly of FIG. 1 in its completely assembled state and as employed to support thereon a video display terminal including a video monitor and a keyboard associated with the video monitor.
Figure 3:
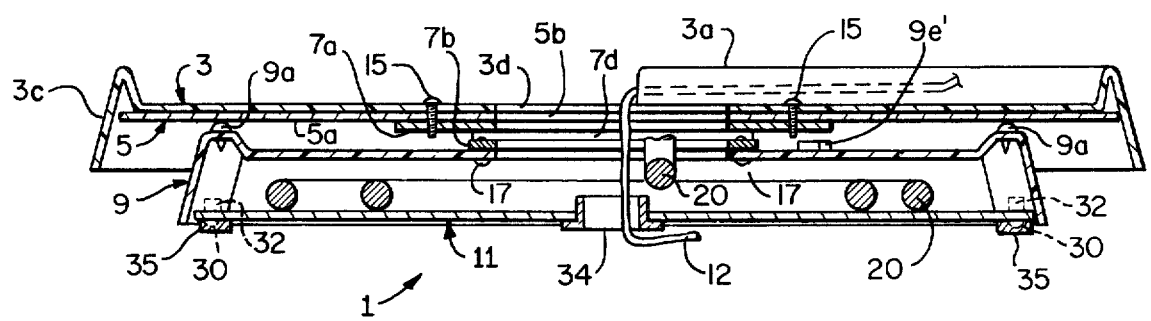
FIG. 3 is a cross-sectional view, taken along line A—A in FIG. 1, illustrating the swivel base assembly of FIG. 1 in its completely assembled state.

The tray 3 further includes a central opening 3d, through which an ac power cable 12 and a data-carrying cable 20 may be fed to the device on the tray 3, as required, and also includes a generally oblong-shaped stop 3e, in the form of a depression in the tray 3, for use in limiting the angular rotational movement of the tray 3, as will be described more fully hereinafter. The tray 3, as described hereinabove, may be fabricated from any one of several well-known materials, for example from ABS (acrylonitrile butadiene styrene), a well-known thermoplastic material having insulating properties.

The aforementioned tray support plate 5 is employed to strenghten and rigidify the tray 3, particularly if the tray 3 is fabricated of a lightweight plastic material such as ABS. The tray support plate 5 also serves to provide a smooth, hard bottom surface, indicated at 5a in FIG. 1, capable of gliding across the bearing surfaces of a plurality of glide members 9a (only one of which is shown in FIG. 1) employed with the base member 9, as will be explained more fully hereinafter. The tray support plate 5 further has a central opening 5b therein, of the same size and aligned coaxially with the central opening 3d of the tray 3, for passage of the aforementioned cables 12 and 20 to the device on the tray, and further has an opening 5c adjacent to the opening 5b through which the depressed stop 3e in the tray 3 extends. The tray support plate 5 is attached to the tray 3 and also to the top plate 7a of the swivel mechanism 7 by means of a plurality of self-tapping screws 15 (only one of which is shown in FIG. 1) arranged to pass through corresponding openings 3f provided in the tray 3, through corresponding openings 5e in the tray support plate 5, and through corresponding openings 7c in the corners of the top plate 7a of the swivel mechanism 7.

The tray support plate 5, as described hereinabove, may be constructed from any suitable material capable of strengthening and rigidifying the tray 3 and which provides a smooth, hard bottom surface for use with the aforementioned glide members 9a, for example, a flat sheet of fibreboard material such as sold commercially under the trade name "Masonite." It will be appreciated that if the tray 3 is formed from a material having sufficient inherent strength and rigidity and provides the required smooth, hard bottom surface for use with the glide members 9a, the tray support plate 5 as described hereinabove may not be necessary and may be eliminated from the swivel base assembly 1.

The swivel mechanism 7, as employed in the invention, is of a standard metal ball-bearing race type wherein the top plate 7a thereof is capable of movement with respect to the bottom plate 7b thereof through the means of ball bearings held captive between the top and bottom plates. The swivel assembly 7 also has a central opening 7d therein, of the same size as and aligned coaxially with the openings 5b and 3d of the tray support plate 5 and the tray 3, respectively, for the passage of the aforementioned cables 12 and 20 to the device on the tray 3. The bottom plate 7b of the swivel assembly 7 further has a plurality of openings 7e in the corners thereof by which the plate 7b may be secured to the base member 9, specifically, by means of metal rivets 17 (only one of which is shown in FIG. 1) arranged to pass through corresponding openings 9b in the base member 9 and the openings 7e in the bottom plate 7b of the swivel assembly 7. The swivel assembly 7 as described above may have plates 7a and 7b of 6 inches square and is commercially available from Triangle Manufacturing Co., Oshkosh, Wisconsin.

The base member 9, on which the tray 3, the tray support plate 5 (if used) and the swivel assembly 7 are positioned, includes an upstanding main body portion 9c and a flange portion 9d integral with and surrounding the main body portion 9c. The main body portion 9c further includes a pair of spaced stop members 9e and 9e', in the form of raised portions of the base member 9, and a generally oblong-shaped cable guide and strain relief member 9f, in the form of a downwardly-sloping depression in the base member 9. The stop members 9e and 9e' are positioned with respect to each other in the main body portion 9c of the base member 9 so that a pair of outer surfaces thereof, shown at 9g in FIG. 1, are angularly spaced from each other, specifically, by 270°, as shown in FIG. 1. This separation establishes the extent of rotation (270°) of the tray 3 with respect to the bottom plate 7b of the swivel assembly 7. More particularly, with the tray 3 secured to the top plate 7a of the swivel assembly 7, the depressed stop 3e in the tray 3 extends through the opening 5c in the tray support plate 5 and is capable of rotational circumferential movement between the outer surfaces 9g of the raised stop members 9e and 9e', the depressed stop member 3e in the tray 3 abutting against the outer surface 9g of one of the raised stop members at the 0° position and against the outer surface 9g of the other raised stop member at the 270° position.

The aforementioned downwardly-sloping cable guide and strain relief member 9f, to be described in greater detail hereinafter, is employed to establish the placement and orientation within the base member 9 of the data-carrying cable 20, such as a data-carrying coaxial cable, and also to provide strain relief protection for the cable 20. The cable 20, which is ordinarily used by a video monitor or other device positioned on the tray 3 employing data signals, is caused to enter the base member 9 via a corresponding opening 9h provided in the main body portion 9c of the base member 9 and, after being circularly wound within the portion 9c of the base member 9, for reasons to be explained hereinafter, to exit the base member 9 via a central opening 9i in the main body portion 9c of the base member 9. The opening 9i is made to be the same size as and aligned coaxially with the aforementioned openings 7d, 5b and 3d of the members 7, 5 and 3, respectively. The opening 9i is also used for the passage of the aforementioned ac power cable 12 to the device on the tray 3.

Figure 7:
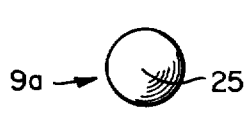
FIG. 5–7 are top, side and front views, respectively, of a glide member as employed with the base member of the swivel base assembly of the invention.
Figure 5:
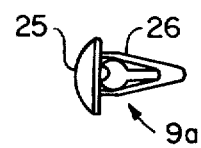
Figure 6:
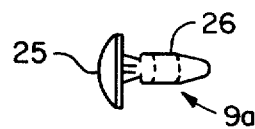

The base member 9 further includes a plurality of upstanding hollow support members or columns 9j formed intergrally with the main body portion 9c and the flange portion 9d of the base member 9 and spaced on the flange portion 9d around the periphery of the main body portion 9c. The vertical support columns 9j have associated glide members 9a (only one of which is shown in FIG. 1) inserted tightly within corresponding openings 9k in the columns 9j for establishing bearing surfaces across which the bottom surface 5a of the tray support plate 5 is able to glide as the tray 3 and the associated tray support plate 5 and the top plate 7a of the swivel base assembly 1 are caused to rotate with respect to the bottom plate 7b of the swivel assembly 7 and the base member 9. The glide members 9a also serve to evenly distribute the weight of a device positioned on the tray 3 as well as the individual weights of the tray 3 and the tray support plate 5. A suitable form of a glide member 9a as described above is shown in detail in FIGS. 5–7. As shown in these figures, the glide member 9a, which may be of plastic, includes a curved head portion 25 and a tapered shank portion 26 integral with the head portion 25, the tapered shank portion 26 enabling the glide member 9a to fit tightly within an associated opening 9k in the base member 9. The glide member 9a as shown in FIGS. 5-7 is commercially available from Eaton Corporation, Engineered Fasteners Division, Cleveland, Ohio. The base member 9 as described hereinabove may, as in the case of the tray 3, be conveniently fabricated from a plastic material such as ABS.

The final major component of the swivel base assembly 1, namely, the bottom cover plate 11, is attached to the base member 9 via the flange portion 9d thereof. This attachment operation is accomplished in a simple manner by inserting a plurality of self-tapping screws 30 (only one of which is shown in FIG. 1) within corresponding openings 11a in the bottom cover plate 11 and threading these screws into corresponding push-in nuts 32 (only one of which is shown on FIG. 1) disposed tightly within corresponding openings 9m in the flange portion 9d of the base member 9. The bottom cover plate 11 further has a central opening 11c therein which is smaller than the other openings 9i, 7d, 5b and 3d but coaxially aligned with these openings. A bushing 34 is inserted within the opening 11c in the bottom cover plate 11 and the aforementioned ac power cable 12 is made to pass through this bushing and the other openings 9i, 7d, 5b and 3d to the device on the tray 3. To insure that the swivel base assembly 1 does not slide along the surface on which it is positioned, a plurality of rubber adhesive-backed feet 35 are secured at spaced locations on the bottom surface of the bottom cover plate 11. The bottom cover plate 11, like the tray support plate 5, may be conveniently fabricated from a material such as Masonite.

Figure 4:
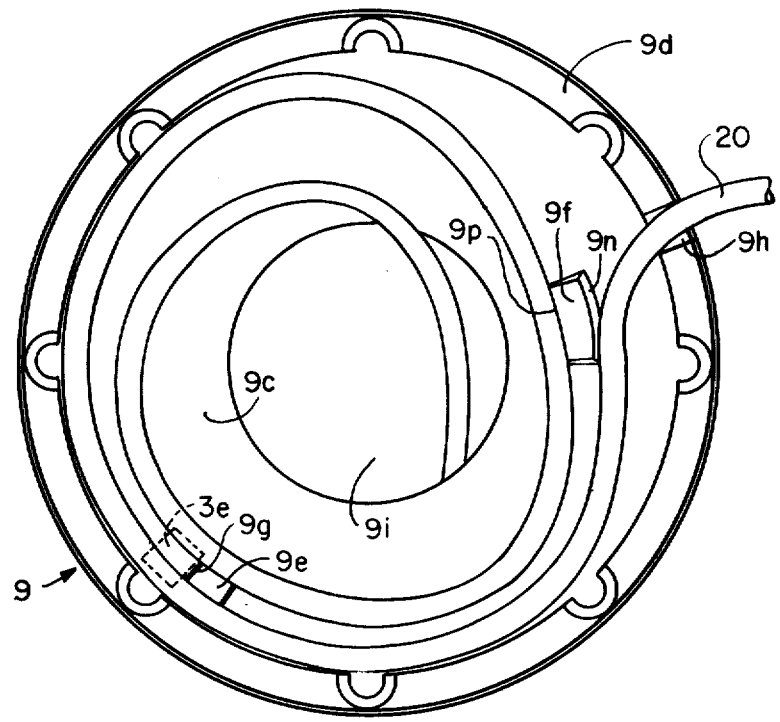
FIG. 4 is a bottom view of a circular base member of the swivel base assembly of FIGS. 1–3, illustrating the manner in which a coaxial cable is circularly wound therein.

Referring now to FIG. 4, there is shown the manner in which the aforedescribed cable 20 (e.g., coaxial cable) is placed within the base member 9. As shown in FIG. 4, the cable 20 is inserted into the opening 9h in the base member 9 and caused to be routed in a clockwise direction around the cable guide and strain relief member 9f and through the central opening 9i in the base member 9. The circular routing of the cable 20 is required, especially when the cable 20 is a coaxial cable, to prevent sharp bends or "kinks" in the cable 20 which might impair its electrical characteristics. The above routing operation is performed only when the tray 3 and the associated elements 5 and 7a of the swivel assembly 1 have been rotated in a clock-wise direction so that the depressed stop member 3e in the tray 3, shown in dotted outline in FIG. 4, abuts against the outer surface 9g of the raised stop member 9e. In this fashion, when the tray 3 and the associated elements 5 and 7a are rotated in the opposite (counterclockwise) direction, the cable 20 winds up tightly like a spring and, accordingly, remains confined within the base member 9. Thus, the rotation of the tray 3 and associated elements in opposite directions causes a winding and unwinding of the cable 20 within the base member 9. Also, by virtue of the fact that the cable is routed around the cable guide and strain relief member 9f so that the cable 20 makes physical contact with opposite sides of the member 9f, specifically, at 9n and 9p in FIG. 4, effective strain relief protection is provided for the cable 20 and the cable 20 cannot be removed from the base member 9 by pulling on it at the point of entry into the base member 9, that is, at the opening 9h.

While there has been described what is considered to be a preferred embodiment of the invention, it will be obvious to those skilled in the art that various changes and modifications may be made therein without departing from the invention as called for in the appended claims.

What is claimed is:

1. A swivel base assembly comprising:

tray means having a top surface on which a device is adapted to be positioned, a bottom surface, and including stop means;

a base arrangement;

swivel means interposed between the tray means and the base arrangement and having a first section attached to the tray means and a second section attached to the base arrangement, said first section and the tray means attached thereto being capable of rotational movement with respect to the second section and the base arrangement to which the second section is attached;

said base arrangment including:

a. stop means cooperative with the stop means of the tray means to establish a predetermined angular range through which the tray means, a device on the tray means, and the first section of the swivel means to which the tray means is attached may rotate;

b. glide means adjacent to the periphery of the swivel means and bearing against the bottom surface of the tray means providing a bearing surface along which the tray means glides when a rotational motion is imparted to the tray means with respect to the second section of the swivel means; and c. a cable-receiving portion defining a chamber and having a cable receiving opening into said chamber, said chamber being arranged to receive a cable means via the cable receiving opening to be used by a device on the tray means and having a capacity to permit said cable means to be wound therein in a generally circular pattern;

said tray means, swivel means and base arrangement each further having an opening therein by which one end of a cable means wound within the chamber of the base arrangement may be fed through the opening in the base arrangement, the opening in the swivel means and the opening in the tray means to a device on the tray means.

2. A swivel base assembly in accordance with claim 1 wherein:

the base arrangement further includes a cable guide and strain relief member adjacent to the cable receiving opening therein and extending into the chamber therein, said cable guide and strain relief member having opposing surfaces against which a cable means may abut when the cable means is arranged in the chamber in a generally circular pattern, thereby providing strain relief protection for the cable means.

3. A swivel base assembly in accordance with claim 1 wherein:

the cable-receiving portion of the base arrangement has a top surface;

the stop means of the tray means includes a single stop member extending downwardly with respect to the bottom surface of the tray means, said stop member being adjacent to the periphery of the swivel means; and the stop means of the base arrangement includes a pair of spaced stop members extending upwardly with respect to the top surface of the cable-receiving portion of the base arrangement, said pair of stop members being adjacent to the periphery of the swivel means and each having an outer surface, said single stop member of the stop means of the tray means being capable of rotational movement between the outer surfaces of the pair of stop members of the stop means of the base arrangement when a rotational motion is imparted to the tray means, the distance between the outer surfaces of the pair of stop members thereby establishing the extent of angular rotation of the tray means.

4. A swivel base assembly in accordance with claim 3 wherein:

the glide means comprises a plurality of upright equispaced columnar support members arranged around the periphery of the cable-receiving portion of the base arrangement, each of the columnar support members having an opening therein and a glide member within the opening and bearing against the bottom surface of the tray means, said glide members evenly distributing the weight of the tray means and a device adapted to be mounted thereon and further providing a plurality of glide surfaces along which the tray means may glide when a rotational motion is imparted to the tray means.

5. A swivel base assembly in accordance with claim 4 wherein:

the tray means includes a rectangular tray having front, rear and first and second sides, said tray further having a first railing along the length of the rear side and along portions of the lengths of the first and second sides and a second railing along the length of the front side.

6. A swivel base assembly in accordance with claim 4 wherein:

the base arrangement further includes a cable guide and strain relief member adjacent to the cable receiving opening therein and extending into the chamber therein, said cable guide and strain relief member having opposing surfaces against which a cable means may abut when the cable means is arranged in the chamber in a generally circular pattern, thereby providing strain relief protection for the cable means.

* * * * *